(12) United States Patent
Srinivasan et al.

(10) Patent No.: US 12,190,260 B2
(45) Date of Patent: *Jan. 7, 2025

(54) VIRTUAL MEASUREMENT SYSTEM FOR BAGGAGE MANAGEMENT

(71) Applicant: AMERICAN AIRLINES, INC., Fort Worth, TX (US)

(72) Inventors: Jayaraman Solavaram Srinivasan, Flower Mound, TX (US); Krishnan Subramanian, Frisco, TX (US); Surendra Babu Badugu, Roanoke, TX (US); Rawnda Draper, Arlington, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,025

(22) Filed: Sep. 18, 2023

(65) Prior Publication Data

US 2024/0005222 A1 Jan. 4, 2024

Related U.S. Application Data

(63) Continuation of application No. 16/809,978, filed on Mar. 5, 2020, now Pat. No. 11,763,209.

(60) Provisional application No. 62/814,778, filed on Mar. 6, 2019.

(51) Int. Cl.
*G06Q 10/00* (2023.01)
*G06F 3/12* (2006.01)
*G06Q 10/02* (2012.01)
*G06Q 30/02* (2023.01)
*G06T 7/62* (2017.01)
*G07B 1/00* (2006.01)

(52) U.S. Cl.
CPC .......... *G06Q 10/02* (2013.01); *G06F 3/1204* (2013.01); *G06F 3/1256* (2013.01); *G06Q 30/0281* (2013.01); *G06T 7/62* (2017.01); *G07B 1/00* (2013.01); *G06Q 2240/00* (2013.01); *G06T 2200/24* (2013.01); *G06T 2207/10028* (2013.01); *G06T 2207/30112* (2013.01)

(58) Field of Classification Search
None
See application file for complete search history.

(56) References Cited

U.S. PATENT DOCUMENTS

| 2013/0162429 A1* | 6/2013 | Pfuhl | A45C 13/18 340/539.32 |
| 2015/0170378 A1* | 6/2015 | Moran | G06V 10/44 348/135 |

* cited by examiner

*Primary Examiner* — Martin Mushambo
(74) *Attorney, Agent, or Firm* — HAYNES AND BOONE, LLP

(57) ABSTRACT

A system that includes a depth perception camera to estimate or otherwise measure the dimensions of a proposed carry-on item to determine whether the proposed carry-on item complies with limitations associated with a user. The system is configured to enable checking the proposed carry-on item and receiving payment for the checked item when the item exceeds the limitations associated with the user. Displayed to the user are dimension lines associated with the maximum dimensions of the limitations and/or the captured dimensions of the proposed carry-on item.

23 Claims, 8 Drawing Sheets

VIRTUAL MEASUREMENT SYSTEM FOR BAGGAGE MANAGEMENT

CROSS-REFERENCE TO RELATED APPLICATIONS

This application is a continuation of U.S. patent application Ser. No. 16/809,978, filed Mar. 5, 2020, which claims the benefit of the filing date of, and priority to, U.S. Application No. 62/814,778, filed Mar. 6, 2019, the entire disclosure of which is hereby incorporated herein by reference.

BACKGROUND

Airline passengers are often allowed a carry-on allowance, which limits the size and number of carry-on bags/items that the passenger can bring into the cabin of an aircraft, and a checked baggage allowance, which details the size and number of checked items that are to be stored in the cargo space of the aircraft. There are often instances in which a passenger intends for a bag to be a carry-on bag and thus stored in the cabin, but the bag exceeds the size limit associated with a carry-on bag and, thus, the bag must be checked and counted toward the passenger's checked baggage allowance. This often results in passenger confusion and/or frustration, especially when this determination is made when boarding the cabin of the aircraft or upon arriving at the airport.

A virtual measurement method for baggage management is needed that allows the passenger to virtually measure his or her baggage, rearrange his or her packed items as needed, select a different bag as needed, and/or pay for his or her checked baggage as needed.

DETAILED DESCRIPTION

A Virtual Measurement System for Baggage Management ("VMSBM") uses a depth perception camera or other visual depth capturing or recording device to measure the dimensions of baggage prior to the baggage being loaded or boarded on an aircraft. Airline passengers are often allowed a carry-on allowance, which limits the size and number of carry-on bags/items that the passenger can bring into the cabin of the aircraft, and a checked baggage allowance, which limits the size and number of checked items that are to be stored in the cargo space of the aircraft. There are often instances in which a passenger intends for a bag to be a carry-on bag and thus stored in the cabin, but the bag exceeds the size limit associated with a carry-on bag and, thus, the bag must be checked and counted toward the passenger's checked baggage allowance. This often results in passenger confusion and/or frustration, especially when this determination is made when boarding the cabin of the aircraft or upon arriving at the airport. The VMSBM allows the passenger to virtually measure his or her baggage, rearrange his or her packed items as needed, select a different bag as needed, and/or pay for his or her checked baggage as needed.

Figure 1:
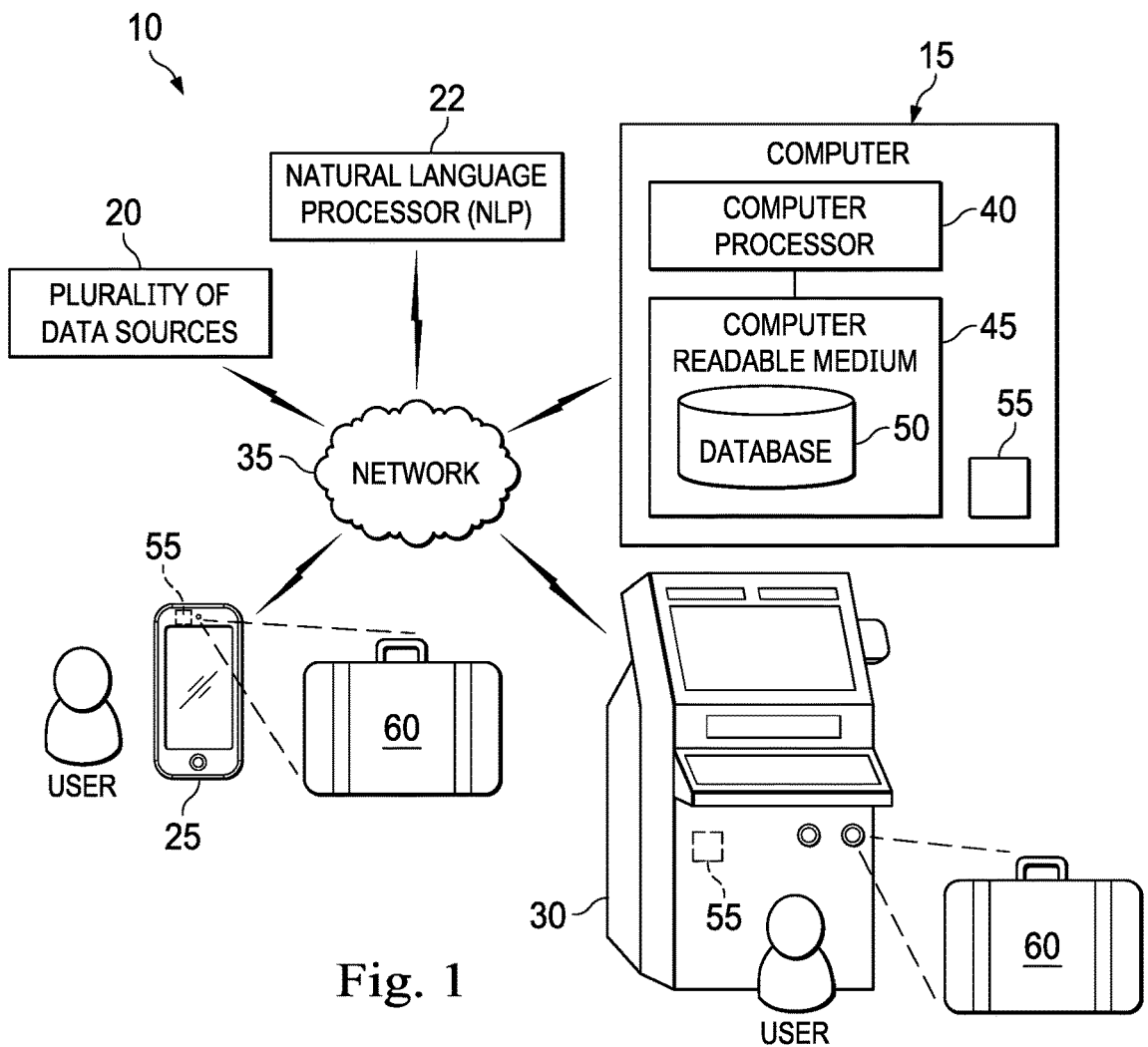
FIG. 1 is a diagrammatic illustration of a baggage measurement system for virtually measuring baggage according to an example embodiment, the system including a mobile device and a kiosk.

In an example embodiment, referring to FIG. 1, an example embodiment of the VMSBM is illustrated and designated by the numeral 10. In an example embodiment, the system 10 includes a computer 15, a plurality of data sources 20, a natural language processor ("NLP") 22 (company developer, in-house developed, or 3rd party integration), one or more mobile devices 25, and one or more kiosks 30, all of which are in communication via a network 35. In one or more example embodiments, the computer 15 includes a computer processor 40 and a computer readable medium 45 operably coupled thereto. Instructions accessible to, and executable by, the computer processor are stored on the computer readable medium 45. A database 50 is also stored in the computer readable medium 45. In one or more example embodiments, the system 10 also includes an application 55 stored in the mobile device 25, the kiosk 30, and/or the computer 15. Generally, a user measures his or her baggage 60 using the system 10 in order to determine if the baggage 60 complies with a baggage allowance associated with that user. If not, then the system 10 provides the user an opportunity to check the baggage 60 and pay for the checked baggage. However, the user may also choose to select a smaller bag to comply with the baggage allowance and avoid checking the smaller bag. As the system 10 allows for the user to manage his or her baggage before arriving at the aircraft and/or the airport, the system 10 avoids gate-area confusion that often occurs when baggage does not fit within the designated space and the baggage is required to be checked during the boarding of the aircraft. Moreover, the system 10 also reduces gate agent time spent checking baggage and securing payment for newly checked baggage, prevents customers from taking inappropriately sized or numbered bags through security, provides an easy payment processing method for checked bags, and ultimately improves the customer experience.

In one embodiment, the plurality of data sources 20 include a first application; a second application; a third application; a fourth application; and a fifth application, among others. In an example embodiment, each of the applications are stored in a computer that includes a processor, computer readable medium, and a database. In some embodiments, each of the applications accesses information from a data source that forms a portion of the one or more applications. However, in other embodiments, one or more of the applications access information from a data source that is separate from and apart from the applications. In some embodiments, more than one application accesses information from one data source.

In an example embodiment, the NLP 22 enables an interface where the user enters search query in natural language, and, based on the user input, the NLP 22 identifies an intent and one or more entities. Generally, the intent is the intention of the user, and an entity is a user parameter. Generally, each intent is mapped to action performed by the system 10. Examples of entities are dates, times, names, places, and more. For example, if the user input is "check in for flight", then "check in" is the intent and action performed by the system 10, and "flight" is an entity. In some embodiments, the NLP 22 is Api.ai or DialogFlow by Google. However, in some embodiments the NLP 22 is IBM Watson, Microsoft Botframework, or LUIS.ai.

Figure 2:
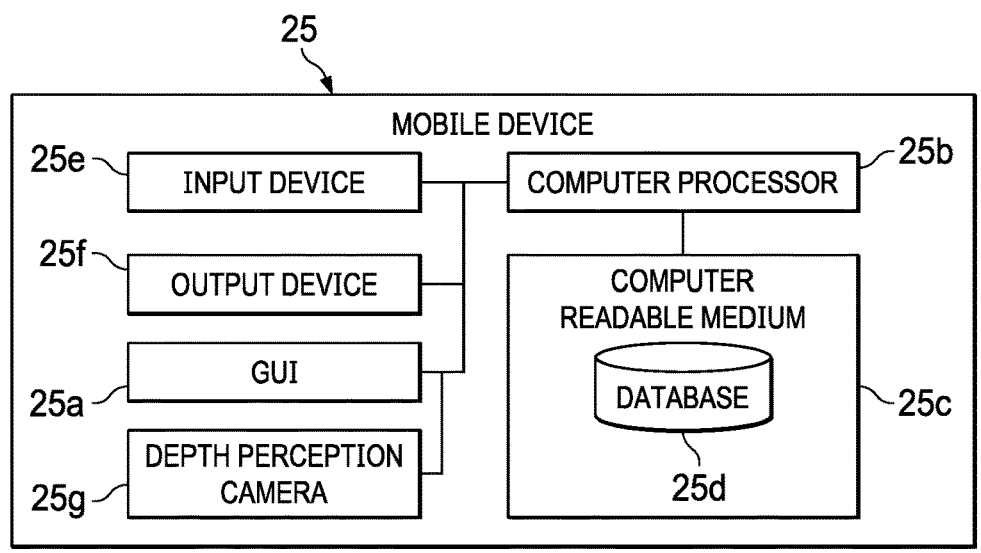
FIG. 2 is a diagrammatic illustration of the mobile device of FIG. 1, according to an example embodiment.

In an example embodiment, as illustrated in FIG. 2 with continuing reference to FIG. 1, the mobile device 25 includes a graphical user interface 25a, a computer processor 25b, and a computer readable medium 25c operably coupled thereto. Instructions accessible to, and executable by, the computer processor 25b are stored on the computer readable medium 25c. A database 25d is also stored in the computer readable medium 25c. Generally, the GUI 25a can display a plurality of windows or screens to the user. The mobile device 25 also includes an input device 25e and an output device 25f. In some embodiments, the input device 25e and the output device 25f are the GUI 25a. In some embodiments, the user provides inputs to the system 10 via a screen 52 (illustrated in FIGS. 6 and 7) that is displayed on the GUI 25a. However, the input device 25e can also be a microphone in some embodiments and the output device 25f is a speaker. In several example embodiments, the mobile device 25 is, or includes, a telephone, a tablet, a personal computer, a personal digital assistant, a cellular telephone or mobile phone, other types of telecommunications devices, other types of computing devices, and/or any combination thereof. In several example embodiments, the mobile device 25 includes a plurality of remote user devices. In some embodiments, the mobile device 25 also includes a depth perception camera 25g, an augmented reality ("AR") camera, or a camera that is otherwise configured to estimate dimensions and depths of an object. Generally, the kiosk 30 is substantially similar to the mobile device in that the kiosk 30 also includes an input device, an output device, a GUI 30a (illustrated in FIG. 3B), a depth perception camera 30b (illustrated in FIG. 3B), a computer processor, a computer readable medium, and a database. In some embodiments, the kiosk 30 includes a printer.

Figure 3A:
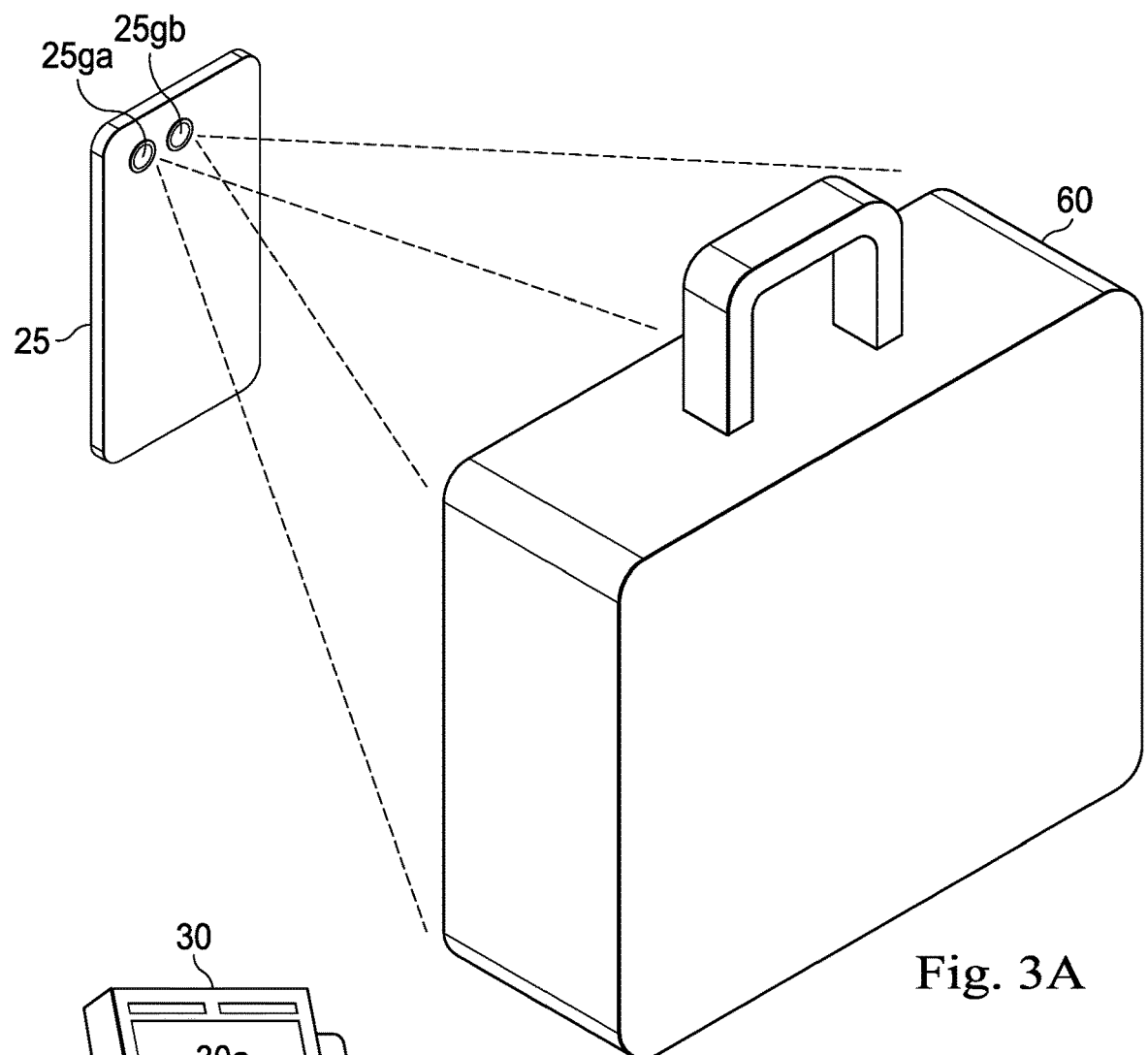
FIG. 3A is an illustration of the mobile device of FIG. 1 and baggage, according to an example embodiment.
Figure 3B:
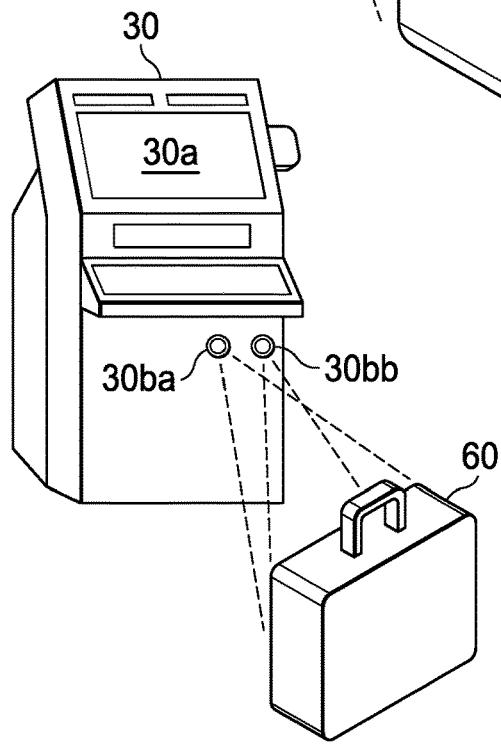
FIG. 3B is an illustration of the kiosk of FIG. 1 and baggage, according to an example embodiment.

In some embodiments and as illustrated in FIG. 3A, the depth perception camera 25g includes a first camera 25ga and a second camera 25gb that are spaced apart from one another to capture different views. In this embodiment, the two different views are compared to determine the depth of the baggage 60 that is captured in the views. In some embodiments and as illustrated in FIG. 3B, the kiosk 30 also includes a camera 30b that in some embodiments includes a first camera 30ba and a second camera 30bb, which function similarly to the first and second cameras 25ga and 25gb. In some embodiments, however, the depth perception camera 25g omits the second camera and the first camera 25ga is configured to change its focal length to bring object(s), such as the baggage 60, in and out of focus. In this embodiment, the clarity of the baggage 60 compared to other items is directly related to the relative position of the focal plane and thus depth of the baggage 60 can be determined based on the change of clarity as the focal length changes. In some embodiments, the depth perception camera 25g omits the second camera 25gb, and the first camera 25ga is configured and/or positioned to receive image(s) of the baggage 60 from different angles and/or distances via the use of mirrors, reflective surfaces, movement of the mobile device 25 relative to the baggage and the like. In some embodiments, the first camera 25ga includes a sensor and a lens. In some embodiments, the sensor includes a plurality of photodetectors that capture light to capture an image, and the lens focuses light onto the sensor. In some embodiments, the first camera 25ga includes multiple lenses that are configured to move toward and away from the sensor to change the focus of the first camera 25ga.

In an example embodiment and referring back to FIG. 1, the network 35 includes the Internet, one or more local area networks, one or more wide area networks, one or more cellular networks, one or more wireless networks, one or more voice networks, one or more data networks, one or more communication systems, and/or any combination thereof.

In one or more example embodiments, the application 55 is stored in the computer readable medium 45 of the computer 15, in a computer readable medium of the kiosk 30, and/or in the computer readable medium 25c of the mobile device 25. In some embodiments, the application 55 includes and/or executes one or more web-based programs, Intranet-based programs, and/or any combination thereof. In an example embodiment, the application 55 includes a computer program including a plurality of instructions, data, and/or any combination thereof. In an example embodiment, the application is written in, for example, Hypertext Markup Language (HTML), Cascading Style Sheets (CSS), JavaScript, Extensible Markup Language (XML), asynchronous JavaScript and XML (Ajax), iOS, XCode, Swift, Android for mobile, and/or any combination thereof. In an example embodiment, the application 55 is a web-based application written in, for example, Java or Adobe Flex, which pulls real-time information from the mobile device 25, the kiosk 30, and/or the plurality of data sources 20. In an example embodiment, the application 55 pulls real-time information from the plurality of data sources 20, upon the execution, opening, or start-up of the application 55. In some embodiments, the application 55 is or includes a mobile front-end application downloaded on the mobile device 25 of the user and the kiosk 30, and a backend application stored or downloaded on the computer 15. Generally, the mobile front-end application communicates with the backend application to display message data regarding the messages created and pushed by the backend application. In some embodiments, the application 55 accesses a camera, microphone, and/or speaker of the mobile device 25 and the kiosk 30.

In some embodiments, baggage 60 includes luggage, purses, backpacks, bags, computer bags, car seats, strollers, and other items that accompany a passenger when the passenger flies in an aircraft or other vehicle.

Figure 4:
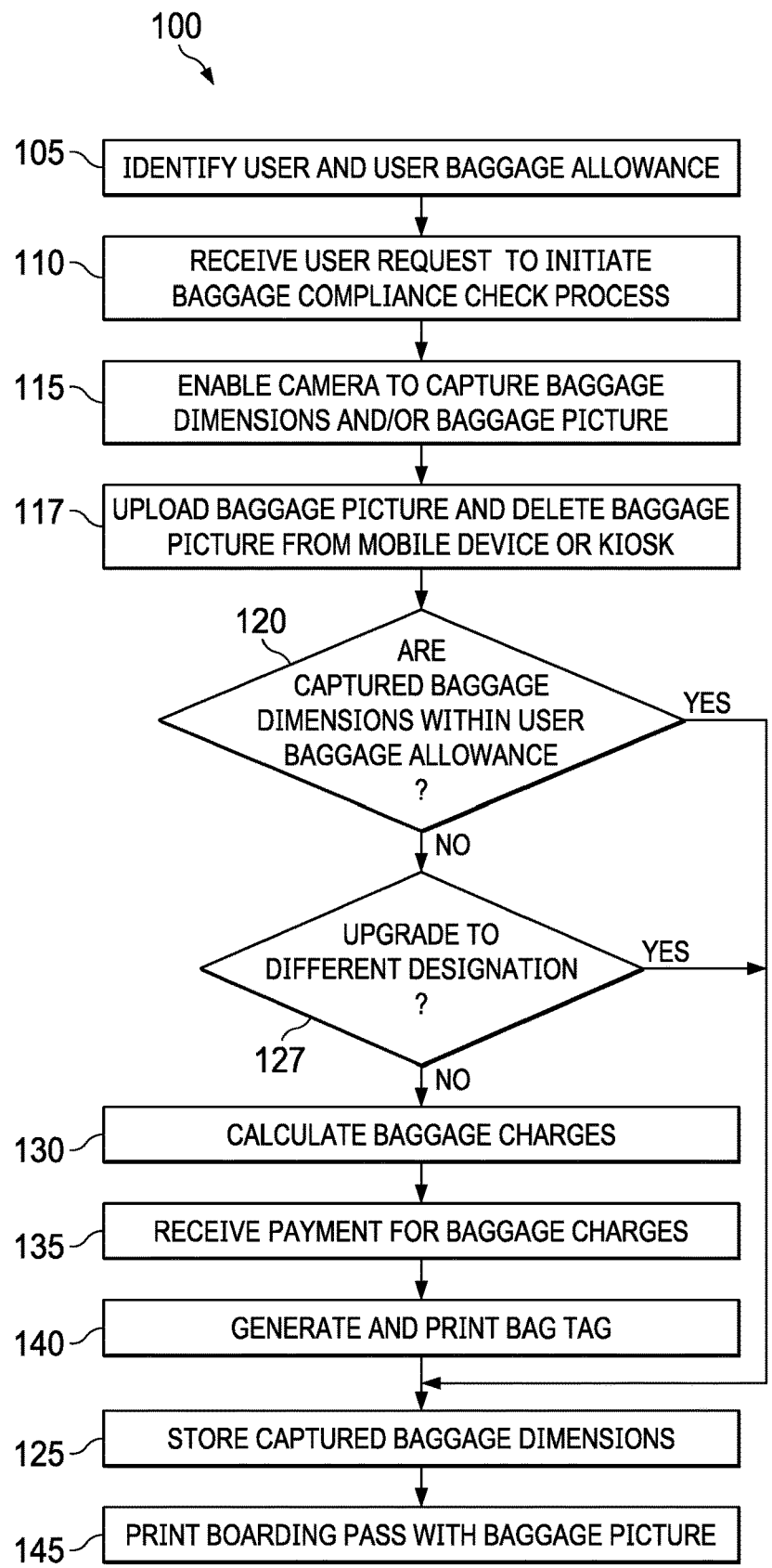
FIG. 4 is a flow chart illustration of a method of operating the system of FIG. 1, according to an example embodiment.

In an example embodiment, as illustrated in FIG. 4 with continuing reference to FIGS. 1-3, a method 100 of operating the system 10 includes identifying the user and the baggage allowance for the user at step 105; receiving a user request to initiate baggage compliance check process at step 110; enabling the camera to capture baggage dimensions and/or a baggage picture at step 115; uploading the baggage picture to the computer and deleting it from the mobile device or the kiosk at step 117; determining whether the captured baggage dimension is within the baggage allowance for the user at step 120; if the captured baggage dimensions are within the baggage allowance, then storing the captured baggage dimensions at step 125; if the captured baggage dimensions are not within the baggage allowance at the step 120, then the method 100 also includes determining whether the user upgrades to a different designation at step 127. When the user does not upgrade to a different designation at step 127, then the method 100 also includes calculating baggage charges using the captured baggage dimensions at step 130, receiving payment for the baggage charges at step 135, and generating and printing a bag tag at step 140 before implementing the step 125. In some embodiments, and when the user does upgrade to a different designation at the step 127, then the next step is the step 125. In some embodiments, the method 100 also includes generating a boarding pass with the bag picture at step 145.

In an example embodiment and at the step 105, the system 10 identifies the user and the baggage allowance associated with the user. In some embodiments, the system 10 identifies the user when the user logs into or provides an identifier to the front-end application downloaded on the mobile device 25 of the user or the kiosk 30. In some embodiments, providing an identifier includes providing a credit card number of the user, scanning a passport or other government issued identification card, providing a phone number or loyalty program number, and/or providing a fingerprint, eye scan, etc. of the user. In some embodiments, identifying the baggage allowance associated with the user includes identifying a scheduled itinerary associated with the user and the class designation for the user for that scheduled itinerary. In some embodiments, the user purchases airfare for a first flight that has a first-class designation and purchases airfare for a second flight that has a second-class designation that is different from the first-class designation. As such, the user and a specific flight of the user must also be identified in order to determine the baggage allowance for the user for that specific flight. In other embodiments, the user purchases airfare with a first-class designation and is not associated with other airfare with different designations. As such, identifying the user alone can automatically identify the baggage allowance for the user. In other embodiments, identifying the user alone will automatically identify the baggage allowance when the user has reached a "status" or other designation such that his baggage allowance is the maximum baggage allowance for each and every flight. For example, if the user has reached a specific status in a rewards program or otherwise, then he or she may be allowed the maximum baggage allowance for all flights. In some embodiments, system 10 identifies the user via a traditional log-in process in which the user provides a user identification number and a password, but as noted above other types of identification methods can be implemented such as for example facial recognition, fingerprint technology, eye scanning, credit card scanning, etc. In some embodiments, the step 105 occurs via a virtual assistant or voice assistant. That is, the user can request, using the NLP 22 and his or her mobile device 25 or another smart device, to log in to the system 10. In some embodiments, a passenger name record ("PNR") of the user includes information or data relating to his or her baggage allowance or the baggage allowance for each traveler associated with the PNR, and the step 105 includes identifying the PNR for the user. Generally, the baggage allowance includes a size and number of items that can only be stored under a seat in the cabin; a size and number of items that can be stored in an overhead bin in the cabin; and a size and number of items that can be stored in the cargo space. That is, in some embodiments and when the user has a specific class designation, he or she cannot store items in an overhead bin but can store items under a seat or near the feet of the user when seated in his or her assigned seat.

In an example embodiment and at the step 110, the system 10 receives a user request to initiate a baggage compliance check process. In some embodiments, the user selects a selectable tab displayed on the GUI 25*a* of the mobile device 25 and/or the GUI 30*a* of the kiosk 30 to request initiation of the baggage compliance check process. In some embodiments, the system 10 initiates the baggage compliance check process without a request from the user. In some embodiments, the user is incentivized to initiate and/or complete the baggage compliance check process. For example, the user may be provided additional reward points in his or her reward account and/or be provided or offered a reduced fare or future airfare credit when the user completes the baggage compliance check process and when the baggage size does not change between the baggage compliance check process and the flight. In some embodiments, the step 110 occurs automatically upon the user checking in for an upcoming flight. Generally, the user must confirm that he or she is planning to travel in accordance with the purchased itinerary, and this is often done during a check-in procedure. In some embodiments, the user checking in for an upcoming flight is the same as the user requesting to initiate the baggage compliance check process. In some embodiments, checking in occurs via NLP and/or a virtual assistant. In some embodiments and during the check-in process, the PNR associated with the user is identified, and the system 10 provides a summary of the baggage allowance for each passenger associated with the PNR. The summary of the baggage allowance can be displayed on the GUI 25*a* of the mobile device 25 and/or the GUI 30*a* of the kiosk 30 and can be provided via an audio format and spoken, via a speaker, to the user, etc. In some embodiments and after providing the summary, the system 10 determines whether the user wants to initiate the baggage compliance check process. This can be via a NLP discussion via a microphone and speaker, the selection of a selectable tab, or by using similar methods. In some embodiments, the baggage allowance comprises a maximum volume that is defined by a first dimension, a second dimension, and a third dimension. In some embodiments and when the designation associated with the user does not allow for overhead bin storage, the maximum dimensions of the baggage allowance are the maximum dimensions associated with the space under a seat.

Figure 5:
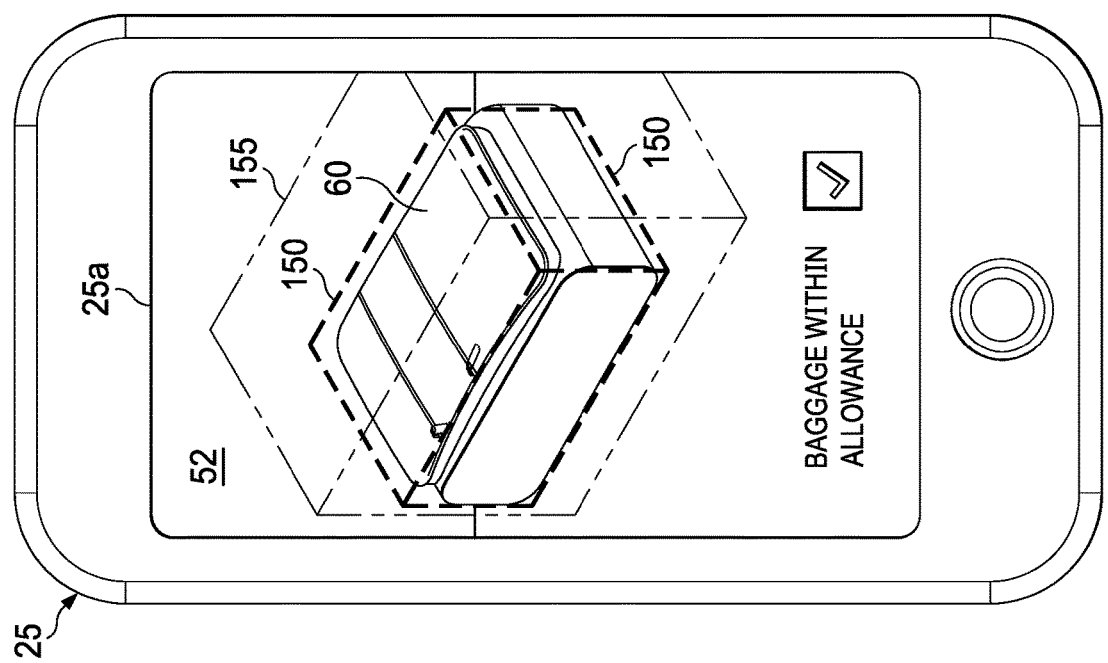
FIG. 5 is a diagrammatic illustration of the mobile device during a step of the method of FIG. 4, according to an example embodiment.

In an example embodiment and at the step 115, the system 10 enables the camera to virtually capture baggage dimensions and/or capture a baggage image. In some embodiments, the camera is the depth perception camera 25*g* of the mobile device 25 or the depth perception camera 30*b* that forms a portion of the kiosk 30. In some embodiments and when the camera is the depth perception camera 25*g* of the mobile device 25, the camera 25*g* is activated via the application 55. That is, the application 55 initiates activation of the camera 25*g* or otherwise accesses the camera 25*g* of the mobile device 25. One example method of virtually capturing baggage dimensions and/or a baggage image using the mobile device 25 includes the user positioning the mobile device 25 relative to a proposed carry-on item or the baggage 60 such that the baggage is within the scope of the camera 25*g*. In some embodiments, the user determines the view captured by the camera via the selection of a shutter button that is displayed on the GUI 25*a*. However, in other embodiments the user merely positions the baggage within the scope of the camera, and the application 55 determines the view(s) or image(s) captured by the camera without the user selecting the shutter button. As illustrated in FIG. 5, the mobile device 25 can display on the GUI 25a an image or depiction of the baggage 60, estimated dimension lines 150 of the baggage 60, and dimension lines 155 associated with a maximum baggage size for the user's baggage allowance. When displayed in this manner, the user can visualize the maximum dimension lines 155 relative to his or her baggage 60. In other embodiments, the mobile device 25 displays only one of the maximum dimension lines 155 and the dimension lines 150 of the baggage over a picture or image of the baggage 60. Generally, the step 115 is similar when using the kiosk 30, except the user positions his or her baggage 60 relative to the kiosk 30 and the camera 30b. The kiosk 30 also displays the dimension lines 150 and/or 155 on the GUI of the kiosk 30 for the user to view. In some embodiments, the identified or captured baggage include a first dimension, a second dimension, and a third dimension.

In an example embodiment and at the step 117, the system 10 uploads the baggage image to the computer 15 and deletes the baggage image from the mobile device 25 or the kiosk 30. In some embodiments, the capturing of the baggage picture creates a photo file and at the step 117, the application 55 uploads or pushes the photo file to the computer 15 and then deletes the photo file from the mobile device 25 or the kiosk 30. At the step 117, the application 55 automatically deletes the photo file from the mobile device 25 or the kiosk 30. That is, the photo file is not stored in the memory of the mobile device 25 or the kiosk 30. In some embodiments, the deletion of the photo file is in response to the uploading, sending, or pushing of the photo file from the mobile device or the kiosk 30.

Figure 6:
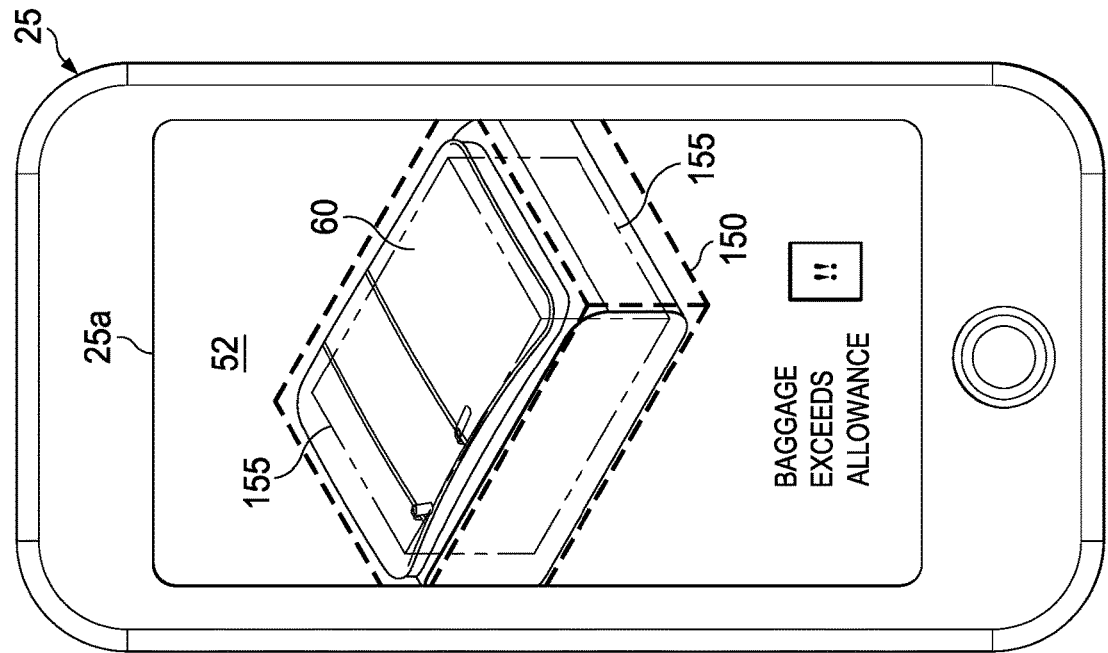
FIG. 6 is another diagrammatic illustration of the mobile device during a step of the method of FIG. 4, according to an example embodiment.

In an example embodiment and at the step 120, the system 10 determines if the captured or identified baggage dimensions are within or comply with the baggage allowance. As noted above, the baggage allowance is often based on the classification or class designation of the user. In some embodiments, the user is only allowed baggage in the cabin that can fit under a seat in the aircraft (i.e., no overhead bin baggage allowance). In some embodiments and when the application 55 has identified in the step 105 the assigned seat for the user and that the assigned seat is associated with a space to stow baggage under a seat, the application 55 compares the captured baggage dimension with dimensions defining the space to stow baggage under the seat. In some embodiments, the step 120 occurs simultaneously with the step 115 such as for example when the captured dimension lines 150 are displayed on the screen along with the maximum dimension lines 155. As some baggage allowances limit the user to stow items under a seat, and other baggage allowances allow the user to stow items in an overhead bin, the spacing of the maximum dimension lines 155 vary based on the user and his or her class designation. The baggage allowances also vary when the storage spaces, themselves, change. That is, overhead bin storage space might be larger in first class as opposed to economy class and/or the allotted dimensions associated with each passenger may be larger in first class as opposed to economy class. Similarly, the under seat stow space might be larger for first class than the under seat stow space in economy or in the main cabin. Thus, the system 10 references a data source that includes the maximum dimensions associated for each class and for each aircraft to determine the appropriate baggage allowance during the step 120. FIG. 5 is an illustration of a screen displayed on the GUI 25a when the application 55 has determined that the baggage 60 is within the baggage allowance, while FIG. 6 is an illustration of a screen displayed on the GUI 25a when the application 55 has determined that the baggage 60 exceeds the baggage allowance.

In an example embodiment and at the step 125, when the captured baggage dimensions are within the baggage allowance, then the system 10 stores the captured baggage dimensions. In some embodiments, the system 10 stores the captured baggage dimensions and—using an image recognition system—estimates the weight of the baggage. A weight estimate can be based on average weights associated with a packed duffle, purse, backpack, or other item. That is, the system 10 scans the baggage 60 using the camera 25g or the camera 30b of the kiosk 30, identifies the item scanned using image recognition, and estimates the weight of the item based on the dimensions and item identified. For example, the system 10 might identify the baggage as a computer bag that is 4"×14"×18". Based on the estimated volume calculated from the captured dimensions and the estimated weight/volume associated with a computer bag, the system estimates that the baggage weighs 15 lbs. In some embodiments, the system 10 uses this estimated weight when determining estimated fuel weights required for the flight. In other embodiments, the system 10 does not estimate weight and only stores the estimated volume of the baggage. Upon tracking multiple or all expected passengers for the flight, the system 10 determines that overhead bin space is full or will be full. In some embodiments, the application 55 determines whether the overhead bin space will likely be full by the time the user boards the plane or aircraft. In that example, the application references the boarding group and seat number of the user to determine if it is likely that the passengers that are expected to board prior to the user will have likely filled up the overhead bin space. In some embodiments, the application 55 references historical data relating to a specific flight, season, date, time, and/or weather; whether the flight is fully or partially booked; data relating to the specific flight, season, date, time, and/or weather; and/or data relating to other baggage dimensions of other passengers within the same flight. In that example, the system 10 can notify passengers that the overhead bin space is estimated as full, request that the passenger check his or her bag (with or without charge), or otherwise prepare for a situation in which the overhead bin space is insufficient for the expected number of bags to be stowed in overhead bins. However, in some embodiments, the system 10 does not store the captured baggage dimensions.

In an example embodiment and at the step 127, when the captured baggage dimensions are not within the baggage allowance, the application 55 determines whether the user wants to upgrade to a different designation. In some embodiments, the application 55 presents an option to the user via a screen to upgrade to a different designation, which has a different baggage allowance for which the captured baggage dimensions comply. In some embodiments, the application 55 identifies a designation that has a baggage allowance that would allow for the baggage to comply with the upgraded baggage allowance. For example, when the user has a designation of economy but the baggage of the user exceeds the baggage allowance associated with the economy designation, then the application 55 determines whether the designation of first class has a baggage allowance that would allow for the user to bring his baggage in the cabin without additional fees and presents the option, to the user, of upgrading from economy to first class. The application 55 presents the option to the user via a selectable button displayed on a screen or the like, and the determination of whether the user wants to upgrade to a different designation is based upon whether the user selects the selectable button confirming an upgrade to a different designation. However, in some embodiments the determination of whether the user wants to upgrade is based upon receiving a response from the user via a microphone, selection of another button on the mobile device 25 or the kiosk 30, or a swiping motion across a screen of the mobile device 25 or the kiosk 30, etc. In some embodiments, the determination of whether to upgrade the user to a different designation may include checking a database or one of the plurality of data sources 20 and the like. In some embodiments, and when the user upgrades his or her designation, the step 127 also includes calculating the upgrade charges, and the next step is the step 125. In some embodiments and when the user does not upgrade his or her designation, the next step is the step 130.

In an example embodiment and at the step 130, the system 10 calculates the baggage charges. For example, when the user is only allowed baggage in the cabin that can fit under a seat, and the captured dimensions exceed the maximum dimensions associated with the storage space under a seat, then the system 10 calculates the price for the user to check the baggage in the cargo space of the aircraft. In some embodiments, there may not be a charge for the user to check the baggage in the cargo space, but in other embodiments there will be a charge. When there are charges for checking the baggage, the system 10 identifies the charge(s). In some embodiments and when the user is only allowed baggage in the cabin that can fit under his or her seat, and the captured dimensions exceed the maximum dimensions associated with the storage space under a seat, the baggage charges are charges for allowing the user to place his or her baggage in an overhead bin (i.e., within the cabin but not limited to in a storage space under a seat). As such, the baggage charges are not limited to checking baggage in the cargo space of the aircraft.

In an example embodiment and at the step 135, the system 10 receives payment for the baggage charges. In some embodiments, the user swipes his or her credit card using a credit card reader that forms a portion of the kiosk 30 during the step 135. In other embodiments, the user places his or her credit card in front of a camera, which automatically scans the payment information. In some embodiments, the user has already stored his or her payment information within the system 10 and receiving payment for the baggage charges includes confirming with the user that they want to charge the default payment method associated with his or her account. In some embodiments, the system 10 uses the NLP 22 and a speaker to ask the user whether he or she wants to use his or her default payment and the user responds using the NLP 22 and an audible response to confirm that he or she wants to pay using his or her default payment method. In other embodiments, receiving payment includes cashing in reward points and/or using any type of electronic payment method. As noted above, in some embodiments there will be no charge to check the baggage and, in that instance, the step 135 may be omitted.

Figure 7:
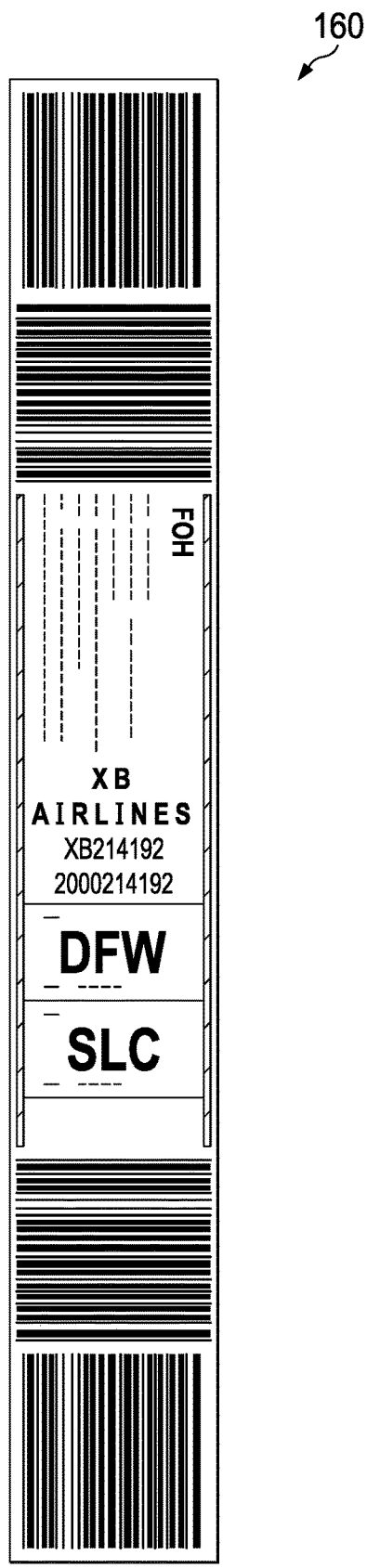
FIG. 7 is an illustration of a bag tag, according to an example embodiment.

In an example embodiment and at the step 140, the system 10 generates and prints a bag tag 160 as illustrated in FIG. 7 when the baggage will be checked in the cargo space of the aircraft. When the user uses the kiosk 30, the kiosk printer prints the bag tag 160 and presents the bag tag 160 to the user. When the user uses his or her mobile device 25, the system 10 emails a copy of a bag tag 160 to the user, automatically causes a bag tag 160 to be printed by a printer in proximity to the user or sends the bag tag 160 to the kiosk 30 for the kiosk 30 to print. Regardless, the user is provided the bag tag 160 to attach to the baggage 60 that will be checked in the cargo space of the aircraft. In some embodiments, the bag tag 160 includes the origination location, the destination location, other flight information such as flight number, and passenger information such as for example passenger name, etc.

In some embodiments, after the step 140 or after the step 120, the system 10 executes the step 125.

Figure 8:
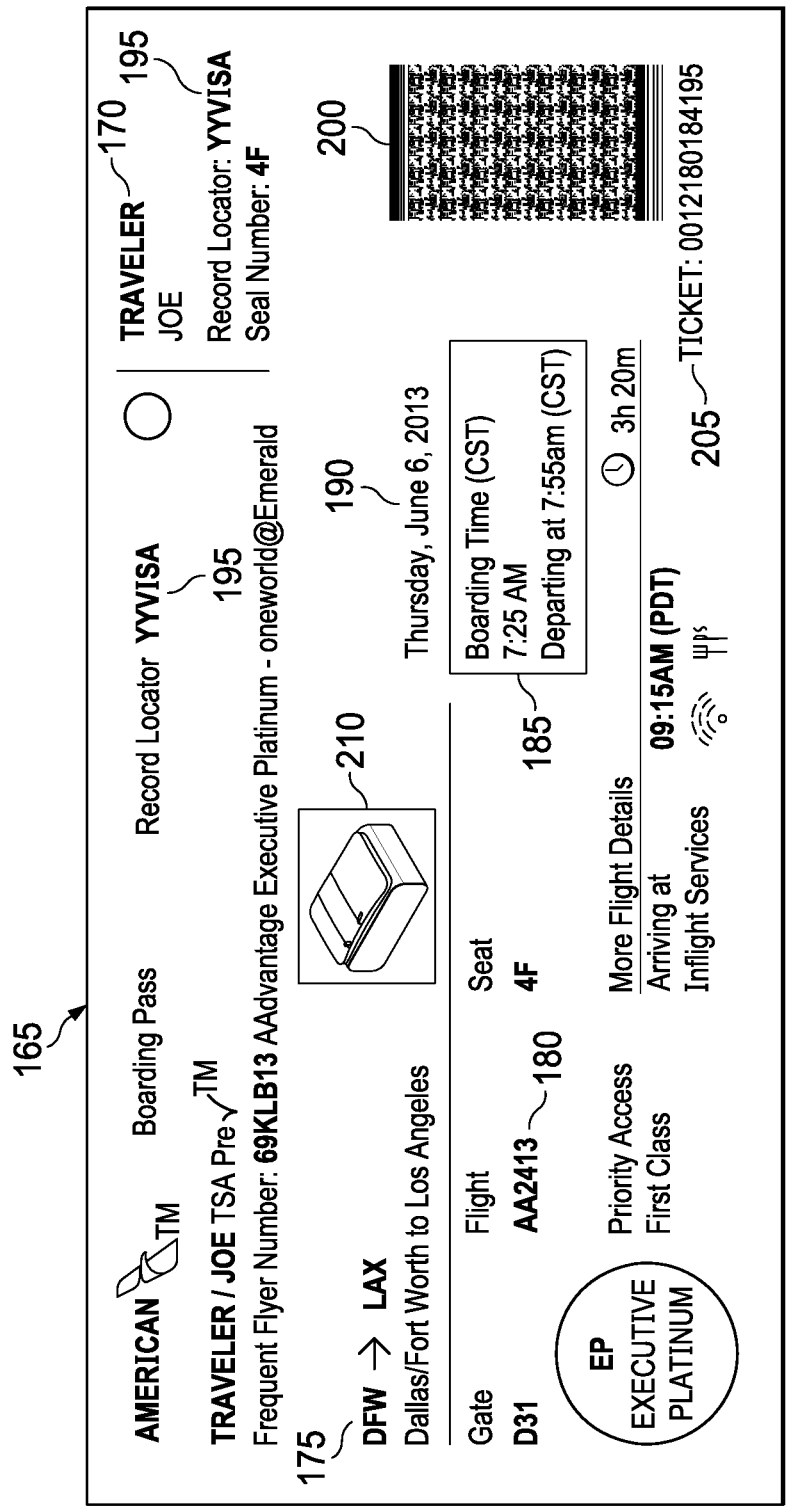
FIG. 8 is an illustration of a boarding pass, according to an example embodiment.
Figure 9:
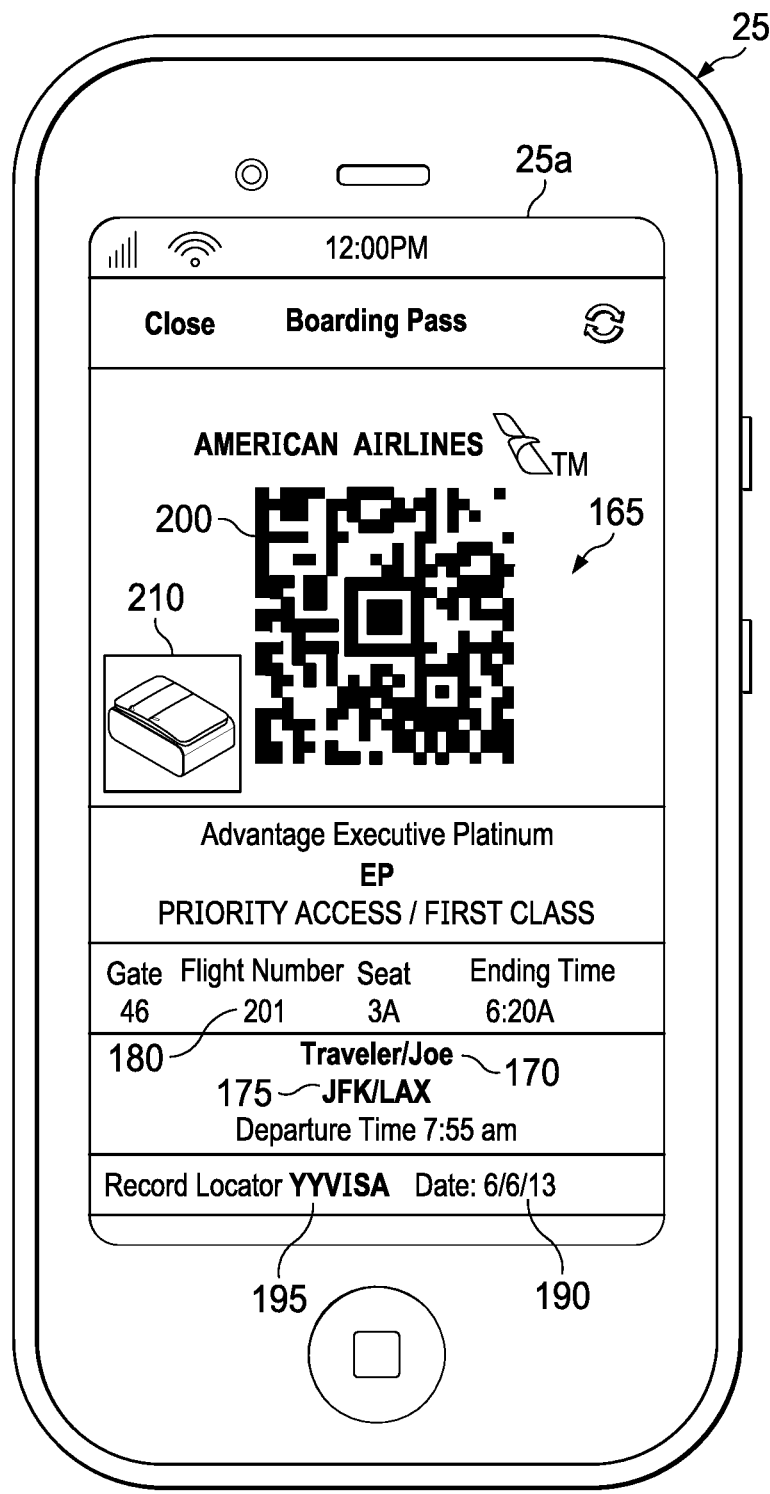
FIG. 9 is another diagrammatic illustration of the mobile device during a step of the method of FIG. 4, according to an example embodiment.

In an example embodiment and at the step 145, a boarding pass is generated that includes the baggage picture. In some embodiments, the application 55 generates a boarding pass identified and referenced by the numeral 165 in FIG. 8. In an example embodiment, the boarding pass 165 generally displays a name 170 of the user, flight origination and destination locations 175, a flight number 180, a boarding time 185, a date 190 on which the travel will occur, a record locator 195, a scannable code 200, a ticket number 205, and a baggage picture 210. In some embodiments, the scannable code 200 is a barcode that is machine-readable and that represents data associated with the boarding pass 165. For example, the scannable code 200 may represent data displayed on the boarding pass 165 and additional information such as a passenger name record. In some embodiments, the scannable code 200 is a 2-D code, but it may also be a linear barcode or combination of both. The scannable code 200 may include a PDF-417 code, a data matrix, a quick response (QR) code, an Aztec code, a Maxicode, etc. In an example embodiment and as illustrated in FIG. 9, the mobile device 25 displays the boarding pass 165, which includes the name 170 of the user, the flight origination and destination locations 175, the flight number 180, the date 190 on which the travel will occur, the record locator 195, the scannable code 200, and the baggage picture 210. Generally, the boarding pass 165 is a travel document. In some embodiments, the boarding pass 165 includes the baggage picture 210 when the baggage 60 does not exceed the baggage allowance and it is expected that the baggage 60 will be allowed within the cabin of the aircraft. In some embodiments, the boarding pass 165 does not include the baggage picture 210 when the baggage 60 is checked to the cargo space of the aircraft. However, in other embodiments, the boarding pass 165 does include the baggage picture 210 when the baggage is checked in the cargo space of the aircraft. The boarding pass 165 then functions as the boarding pass and baggage receipt of the checked bag.

In some embodiments, the method 100 also includes comparing the baggage 60 of the user with the baggage picture 210 when the user presents his or her boarding pass 165 prior to boarding the aircraft. In some embodiments, an employee of an airline or other attendant that receives and checks the boarding pass 165 when the user prepares to board the aircraft scans the boarding pass 165 using an electronic scanner to record that the user is boarding the plane and check to ensure that the boarding pass corresponds with the aircraft that the user is attempting to board. When the baggage 60 is a carry-on bag that the user is bringing into the cabin of the aircraft, the attendant visually confirms that the baggage 60 is identical or substantially similar to the baggage picture 210 on the boarding pass. When the baggage 60 is identical or substantially similar to the baggage picture 210, the attendant allows the user to bring his or her baggage 60 into the cabin. When the baggage 60 is not identical or substantially similar to the baggage picture 210, the attendant may check to ensure that the baggage 60 attempted to be brought into the cabin by the user complies with the baggage allowance associated with the user; notes in the system 10 that the user is attempting to carry-on baggage 60 that is not identical or substantially similar to the baggage picture 210; checks the baggage 60 into the cargo space of the aircraft when the baggage 60 does not comply with the baggage allowance; and/or receives payment from the user when there are baggage costs associated with the checking of the bag.

Generally, use of the system 10 and/or implementation of at least a portion of the method 100 improves the aircraft boarding process for all passengers boarding the aircraft, as there are fewer people notified at the time of boarding that their baggage cannot be stowed in the cabin and fewer people waiting on other people to check their bags. Moreover, in some embodiments, use of the system 10 and/or implementation of at least a portion of the method 100 improves the planning and preparation of the flight, such as for example by notifying and preparing the crew for an overly full overhead bin situation, by notifying and preparing the flight support system for an increased amount of fuel weight required for a flight, and by notifying and preparing passengers for the need to check bags due to an insufficient amount of space in the overhead bins.

Generally, use of the system 10 and/or implementation of at least a portion of the method 100 results in the display of dimension lines 155 on a GUI so that the user can see the size of his or her bag relative to the maximum dimension lines 155. This results in an improvement to the customer check-in process, an improvement to flight planning, and an improvement to the customer or passenger boarding process. As such, the system 10 and/or the method 100 involves a practical application in which the technical field of user baggage management and/or airline baggage management is improved.

Moreover, and in some embodiments, the system 10 requires a camera that is configured to estimate or measure a depth of an item. As such, the camera 25g and/or the camera 30b is a particular machine that implements the method 100 in a meaningful way that results in a practical application of virtually measuring baggage.

While the method 100 and the system 10 are described as relating to an aircraft and cabin space in the aircraft, the method 100 and/or the system 10 may be related to any vehicle and is not limited to the aircraft. Instead, the vehicle may be a ship, a train, a bus, etc. Moreover, while the method 100 and the system 10 are described as relating to a flight, the method 100 and/or the system 10 may be related to any travel leg and not limited to a flight. Instead, the travel leg may be a bus ride, a passage on a ship, a train ride, etc.

Using the system 10, the automated collection and storage of the photo file to the computer 15 (directly from mobile device 25 and the kiosk 30) avoids the storage of the photo file in the mobile device 25 and the kiosk 30, thereby improving the functioning of each of mobile device 25 and the kiosk 30 by increasing the unused memory available in each of the mobile device 25 and the kiosk 30. In an example embodiment of the system 10, when a photo file is created using the mobile device 25 or the kiosk 30, the photo file is not stored in the memory of the mobile device 25 or the kiosk 30, as the photo file is automatically uploaded to the computer 15. Thus, the system 10 improves the functioning of the mobile device 25 and the kiosk 30 because the photo file is not stored in the memory of the mobile device 25 or the kiosk 30.

Figure 10:
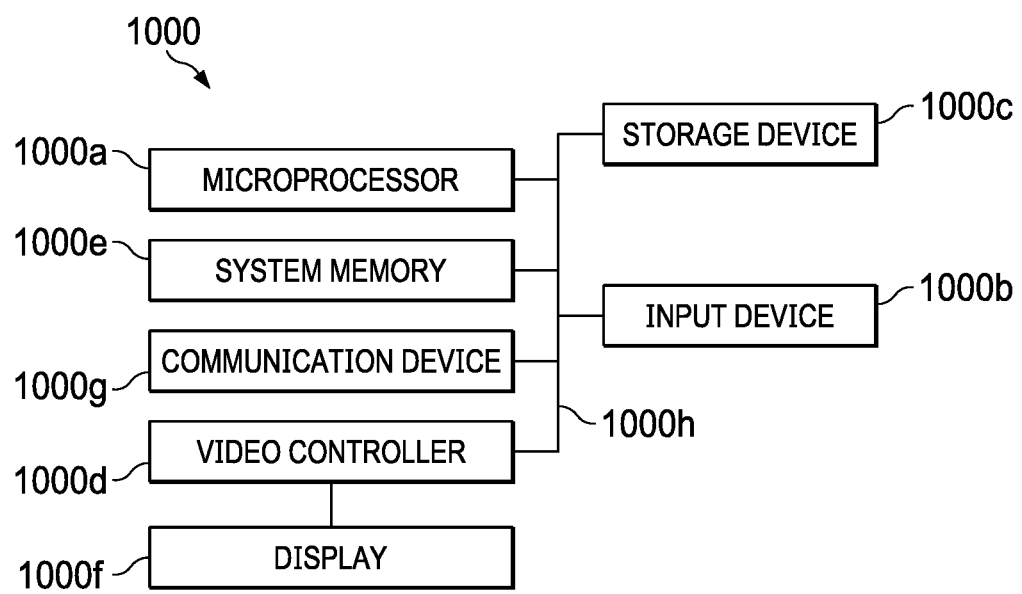
FIG. 10 is a diagrammatic illustration of a node for implementing one or more example embodiments of the present disclosure, according to an example embodiment.

In an example embodiment, as illustrated in FIG. 10 with continuing reference to FIGS. 1-9, an illustrative node 1000 for implementing one or more of the example embodiments described above and/or illustrated in FIGS. 1-9 is depicted. The node 1000 includes a microprocessor 1000a, an input device 1000b, a storage device 1000c, a video controller 1000d, a system memory 1000e, a display 1000f, and a communication device 1000g, all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1-9 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-9 include respective pluralities of same components.

In several example embodiments, one or more of the applications, systems, and application programs described above and/or illustrated in FIGS. 1-9 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine-readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and handheld processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read-only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, handhelds, and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In several example embodiments, a plurality of instructions stored on the computer readable medium 45 is executed by the processor 40 to cause the processor 40 to carry out or implement in whole or in part the above-described operation of each of the above-described example embodiments of the system, the method, and/or any combination thereof.

The present disclosure introduces a method that includes capturing a first image of baggage using a depth perception camera; identifying baggage dimensions of the baggage based on the first image of the baggage and at least one processor; identifying, using the at least one processor, maximum dimensions associated with a baggage allowance associated with a user; determining, using the at least one processor, whether the identified baggage dimensions exceed the maximum dimensions; when the identified baggage dimensions do not exceed the maximum dimensions, then storing the first image of the baggage; and when the identified baggage dimensions exceed the maximum dimensions, then notifying the user that the baggage does not conform with the baggage allowance via a graphical user interface associated with the at least one processor. In one embodiment, the maximum dimensions comprise a first dimension, a second dimension, and a third dimension; and wherein the method further comprises: displaying, on the graphical user interface, the first image of the baggage; and displaying, on the graphical user interface and over the first image of the baggage, a depiction of at least one of the first dimension, the second dimension, and the third dimension relative to the baggage. In one embodiment, determining the identified baggage dimensions is further based on a second image of the baggage that is different from the first image. In one embodiment, the depth perception camera comprises a first camera and a second camera; and wherein the first image is captured using the first camera and the second image is captured using the second camera. In one embodiment, the baggage allowance comprises an amount of space in an overhead bin of a vehicle; and wherein the method further comprises: determining whether the amount of space in the overhead bin of the vehicle is expected to be unavailable to the user; and when the identified baggage dimensions do not exceed the maximum dimensions and when the amount of space is expected to be unavailable to the user, notifying the user that the overhead bin is expected to be full via the graphical user interface and printing a bag tag; wherein the bag tag is configured to be attached to the baggage. In one embodiment, identifying, using the at least one processor, the maximum dimensions associated with the baggage allowance associated with the user comprises: identifying a seat assigned to the user for a travel leg on the vehicle; and determining whether the seat is associated with storage below another seat. In one embodiment, the maximum dimensions correspond to dimensions of an overhead bin or dimensions of a space below a seat. In one embodiment, the method also includes generating a boarding pass that includes the first image of the baggage. In one embodiment, the maximum dimensions are associated with a first designation of the user; wherein the first designation of the user in one of a plurality of designations; wherein a second designation from the plurality of designations has maximum dimensions that are greater than the maximum dimensions associated with the first designation; and wherein the method further comprises, when the identified baggage dimensions exceed the maximum dimensions, presenting to the user via the graphical user interface an option to upgrade to the second designation. In one embodiment, the depth perception camera is a part of a mobile device or a kiosk; wherein the method further comprises: pushing the first image of the baggage from the mobile device or the kiosk to a computer that is remote from the mobile device and the kiosk; and after pushing the first image of the baggage from the mobile device or the kiosk, automatically deleting the first image of the baggage from the mobile device or the kiosk; and wherein when the identified baggage dimensions do not exceed the maximum dimensions, then storing the first image of the baggage comprises storing the image of the baggage in a computer that is remote from the mobile device and the kiosk.

The present disclosure also introduces a measurement system that compares maximum dimensions associated with a baggage allowance of a user with identified baggage dimensions using a depth perception camera, the system comprising: the depth perception camera; a graphical user interface; and a non-transitory computer readable medium having stored thereon a plurality of instructions, wherein when the instructions are executed with at least one processor, the following steps are executed: capturing a first image of the baggage using the depth perception camera; identifying baggage dimensions of the baggage based on the first image of the baggage; identifying the maximum dimensions associated with the baggage allowance of the user; determining whether the identified baggage dimensions exceed the maximum dimensions; when the identified baggage dimensions do not exceed the maximum dimensions, then storing the image of the baggage; and when the identified baggage dimensions exceed the maximum dimensions, then notifying the user that the baggage does not conform with the baggage allowance via the graphical user interface. In one embodiment, the maximum dimensions comprise a first dimension, a second dimension, and a third dimension; and wherein when the instructions are executed with at least one processor, the following steps are also executed: displaying, on the graphical user interface, the first image of the baggage; and displaying, on the graphical user interface and over the first image of the baggage, a depiction of at least one of the first dimension, the second dimension, and the third dimension relative to the baggage. In one embodiment, determining the identified baggage dimensions is further based on a second image of the baggage that is different from the first image. In one embodiment, the depth perception camera comprises a first camera and a second camera; and wherein the first image is captured using the first camera and the second image is captured using the second camera. In one embodiment, the system also includes a printer that is in communication with the non-transitory computer readable medium; wherein the baggage allowance is an amount of space in an overhead bin of a vehicle; and wherein when the instructions are executed with at least one processor, the following steps are also executed: determining whether the amount of space allotted in the overhead bin of the vehicle is expected to be unavailable to the user; and when the identified baggage dimensions do not exceed the maximum dimensions; and when the amount of space allotted to the user is expected to be unavailable to the user, notifying the user that the overhead bin is expected to be full via the graphical user interface and printing a bag tag using the printer; wherein the bag tag is configured to be attached to the baggage. In one embodiment, identifying, using the at least one processor, the maximum dimensions associated with the baggage allowance associated with the user comprises: identifying a seat assigned to the user for a travel leg on the vehicle; and determining whether the seat is associated with storage below another seat. In one embodiment, the maximum dimensions correspond to dimensions of an overhead bin or dimensions of a space below a seat. In one embodiment, when the instructions are executed with at least one processor, the following step is also executed: generating a boarding pass that includes the image of the baggage. In one embodiment, the system also includes a printer that is in communication with the non-transitory computer readable medium; wherein when the instructions are executed with at least one processor, the following step is also executed: printing the boarding pass using the printer. In one embodiment, the depth perception camera, the graphical user interface, and the non-transitory computer readable medium are parts of a mobile phone and/or a kiosk.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method comprising:
capturing a first image of an item using a visual depth capturing or recording device;
identifying item dimensions of the item based on the first image of the item and at least one processor;
identifying, using the at least one processor, maximum dimensions associated with a first designation;
determining, using the at least one processor, whether the identified item dimensions exceed the maximum dimensions;
when the identified item dimensions exceed the maximum dimensions, then notifying a user that the item does not conform with the maximum dimensions via a graphical user interface associated with the at least one processor;
wherein the first designation is one of a plurality of designations; and
wherein a second designation from the plurality of designations has maximum dimensions that are greater than the maximum dimensions associated with the first designation;
and
when the identified item dimensions exceed the maximum dimensions, presenting to the user via the graphical user interface an option to change to the second designation.

2. The method of claim 1, wherein the item is baggage.

3. The method of claim 2, wherein the first designation is carry-on and the second designation is checked baggage.

4. The method of claim 2, wherein each of the first designation and the second designation is a class designation of the user.

5. The method of claim 2, further comprising generating a boarding pass that includes the first image of the baggage.

6. The measurement system of claim 5,
wherein the maximum dimensions comprise a first dimension, a second dimension, and a third dimension; and
wherein when the instructions are executed with at least one processor, the following steps are also executed:
displaying, on the graphical user interface, the first image of the item; and
displaying, on the graphical user interface and over the first image of the item, a depiction of at least one of the first dimension, the second dimension, and the third dimension relative to the item.

7. The measurement system of claim 5,
wherein determining the identified item dimensions is further based on a second image of the item that is different from the first image.

8. The measurement system of claim 7,
wherein the visual depth capturing or recording device comprises a depth perception camera;
wherein the depth perception camera comprises a first camera and a second camera; and
wherein the first image is captured using the first camera and the second image is captured using the second camera.

9. The measurement system of claim 5, further comprising a printer that is in communication with the non-transitory computer readable medium;
wherein the item is baggage;
wherein the identified items dimensions are identified baggage dimensions;
wherein the first designation is associated with a baggage allowance;
wherein the baggage allowance is an amount of space in an overhead bin of a vehicle; and
wherein when the instructions are executed with at least one processor, the following steps are also executed:
determining whether the amount of space allotted in the overhead bin of the vehicle is expected to be unavailable to the user; and
when the identified baggage dimensions do not exceed the maximum dimensions and when the amount of space allotted to the user is expected to be unavailable to the user, notifying the user that the overhead bin is expected to be full via the graphical user interface and printing a bag tag using the printer;
wherein the bag tag is configured to be attached to the baggage.

10. The measurement system of claim 9, wherein identifying, using the at least one processor, the maximum dimensions associated with the baggage allowance associated with the user comprises:
identifying a seat assigned to the user for a travel leg on the vehicle; and
determining whether the seat is associated with storage below another seat.

11. The method of claim 1,
wherein the maximum dimensions comprise a first dimension, a second dimension, and a third dimension; and
wherein the method further comprises:
displaying, on the graphical user interface, the first image of the item; and
displaying, on the graphical user interface and over the first image of the item, a depiction of at least one of the first dimension, the second dimension, and the third dimension relative to the item.

12. The method of claim 1, wherein determining the identified item dimensions is further based on a second image of the item that is different from the first image.

13. The method of claim 12,
wherein the visual depth capturing or recording device comprises a depth perception camera;
wherein the depth perception camera comprises a first camera and a second camera; and
wherein the first image is captured using the first camera and the second image is captured using the second camera.

14. The method of claim 1,
wherein the item is baggage;
wherein the identified items dimensions are identified baggage dimensions;
wherein the first designation is associated with a baggage allowance;
wherein the baggage allowance comprises an amount of space in an overhead bin of a vehicle; and
wherein the method further comprises:
determining whether the amount of space in the overhead bin of the vehicle is expected to be unavailable to the user; and
when the identified baggage dimensions do not exceed the maximum dimensions and when the amount of space is expected to be unavailable to the user, notifying the user that the overhead bin is expected to be full via the graphical user interface and printing a bag tag;

wherein the bag tag is configured to be attached to the baggage.

15. The method of claim 14, wherein identifying, using the at least one processor, the maximum dimensions associated with the baggage allowance associated with the user comprises:
   identifying a seat assigned to the user for a travel leg on the vehicle; and
   determining whether the seat is associated with storage below another seat.

16. The method of claim 1, wherein the maximum dimensions correspond to dimensions of an overhead bin or dimensions of a space below a seat.

17. A measurement system that compares maximum dimensions associated with an item allowance of a user with identified item dimensions of an item using a visual depth capturing or recording device, the system comprising:
   the visual depth capturing or recording device;
   a graphical user interface; and
   a non-transitory computer readable medium having stored thereon a plurality of instructions, wherein when the instructions are executed with at least one processor, the following steps are executed:
      capturing a first image of the item using the visual depth capturing or recording device;
      identifying item dimensions of the item based on the first image of the item;
      identifying the maximum dimensions associated with a first designation;
      determining whether the identified item dimensions exceed the maximum dimensions;
      when the identified item dimensions exceed the maximum dimensions, then notifying a user that the item does not conform with the item allowance via the graphical user interface;
      wherein the first designation of the user is one of a plurality of designations; and
      wherein a second designation from the plurality of designations has maximum dimensions that are greater than the maximum dimensions associated with the first designation;
      and
      when the identified item dimensions exceed the maximum dimensions, presenting to the user via the graphical user interface an option to change to the second designation.

18. The measurement system of claim 17, wherein the item is baggage.

19. The measurement system of claim 18, wherein the first designation is carry-on and the second designation is checked baggage.

20. The measurement system of claim 18, wherein each of the first designation and the second designation is a class designation of the user.

21. The measurement system of claim 18, wherein when the instructions are executed with at least one processor, the following step is also executed: generating a boarding pass that includes the first image of the baggage.

22. The measurement system of claim 21, further comprising a printer that is in communication with the non-transitory computer readable medium;
   wherein when the instructions are executed with at least one processor, the following step is also executed: printing the boarding pass using the printer.

23. The measurement system of claim 17, wherein the maximum dimensions correspond to dimensions of an overhead bin or dimensions of a space below a seat.

* * * * *